United States Patent [19]

Mann

[11] 4,279,228
[45] Jul. 21, 1981

[54] DEVICE FOR THE CONTROL OF THE TRAVELING SPEED OF A MOTOR VEHICLE

[75] Inventor: Arnold Mann, Bieber, Fed. Rep. of Germany

[73] Assignee: VDO Adolf Schindling AG, Frankfurt am Main, Fed. Rep. of Germany

[21] Appl. No.: 80,861

[22] Filed: Oct. 1, 1979

[30] Foreign Application Priority Data

Oct. 5, 1978 [DE] Fed. Rep. of Germany ....... 2843456

[51] Int. Cl.³ ............................................. F02D 11/10
[52] U.S. Cl. .................................... 123/352; 123/350; 123/357; 180/176
[58] Field of Search ............... 123/350, 352, 357, 358; 180/178, 179, 176, 177, 174, 170

[56] References Cited

U.S. PATENT DOCUMENTS

| | | | |
|---|---|---|---|
| 2,822,882 | 2/1958 | Campbell | 123/350 |
| 3,407,793 | 10/1968 | Lang | 123/358 |

*Primary Examiner*—Ronald B. Cox
*Attorney, Agent, or Firm*—Martin A. Farber

[57] ABSTRACT

Device for the control of the traveling speed of a motor vehicle with a vehicle-driver-actuatable gas pedal and with means for the transmission of the movement of the gas pedal to an element which element influences the fuel-air mixture particularly the throttle valve, which means contain a position encoder with a rheostat and a limit switch, the position encoder being coupled with the gas pedal. The position encoder has a housing with a hollow cylindrical interior space in which the rheostat is located, the latter being fixed to the housing prevented from twisting with one of its two relatively moveable parts. With its other part the rheostat is connected with a bell-shaped body which is rotatably mounted in the hollow cylindrical interior space and is rotatable from a rest position against the force of a return spring by means of the gas pedal as well as being provided with means via which, upon rotation of the bell-shaped body by a certain pregiven amount, an electric switch is actuatable, the electric switch being secured on the housing.

12 Claims, 5 Drawing Figures

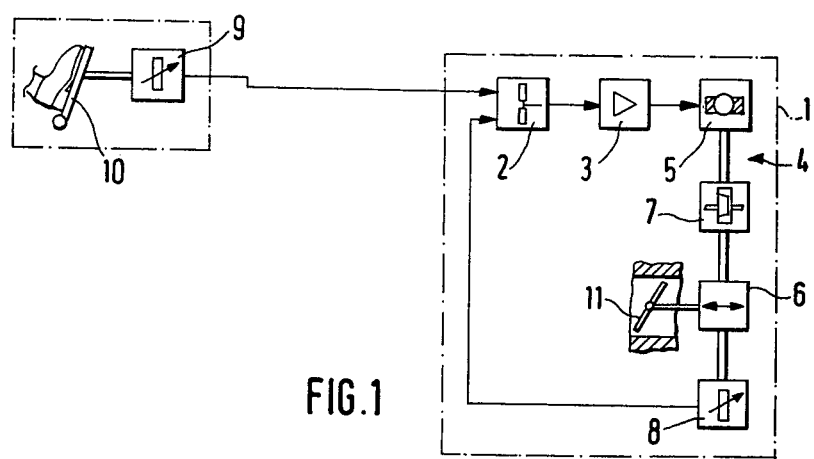
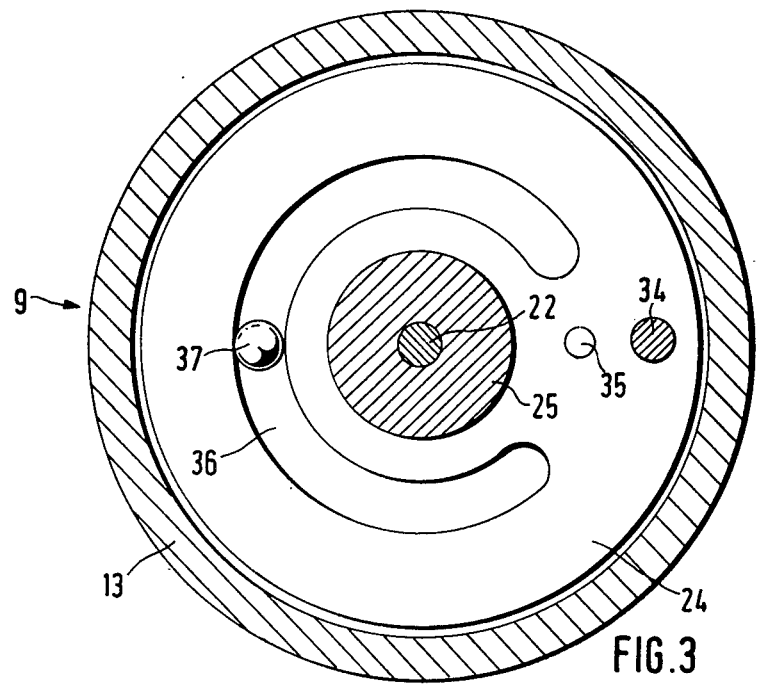

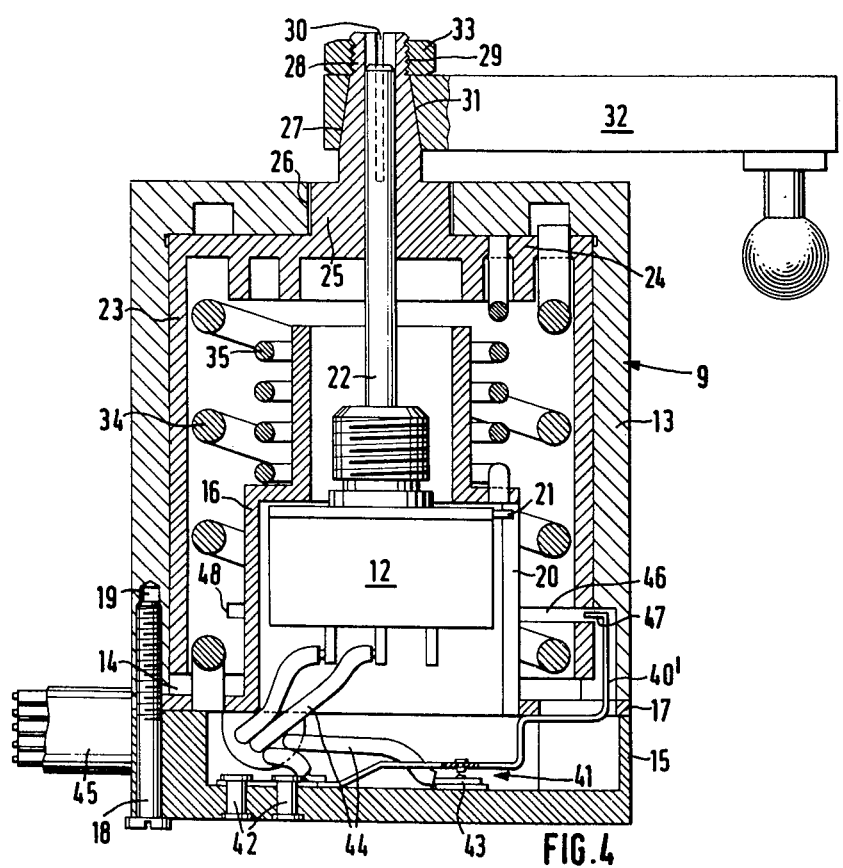

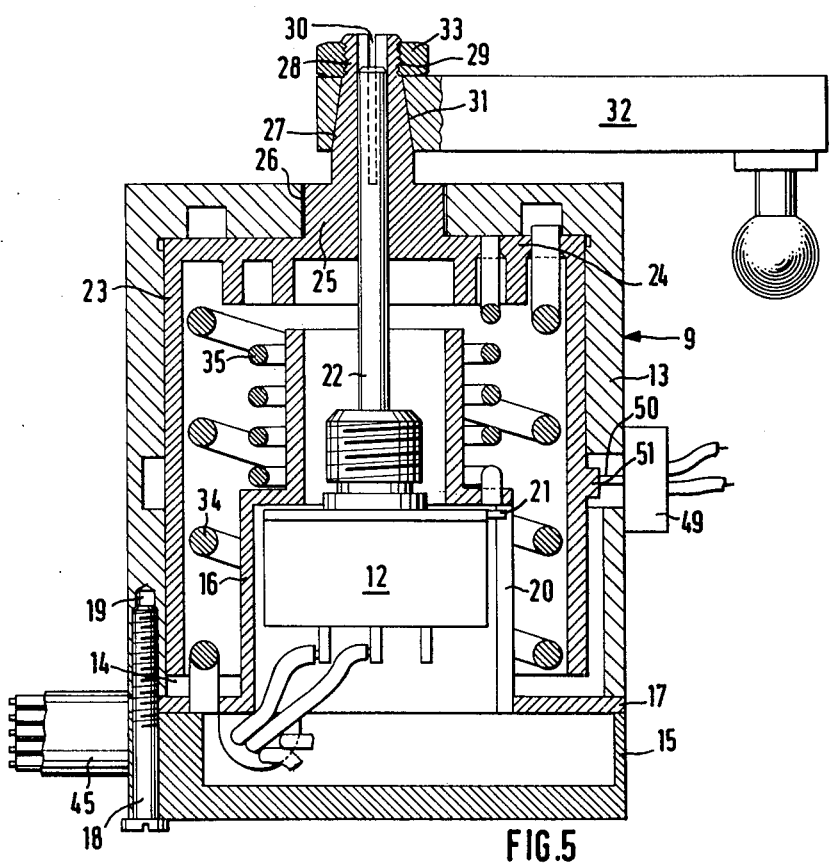

DEVICE FOR THE CONTROL OF THE TRAVELING SPEED OF A MOTOR VEHICLE

The invention concerns a device for the control of the traveling speed of a motor vehicle with a gas pedal which is actuatable by the driver and with means for the transmission of the movement of the gas pedal to an element, which element influences the fuel-air mixture, particularly the throttle valve, which means contain a position encoder with an adjustable rheostat and a limit switch, which position encoder is coupled with the gas pedal.

With known devices of this type the adjustable rheostat and the limit switch (the limit switch being provided as a kick-down switch) in the vicinity of the gas pedal together with additional elements for achieving the desired setting or controlling force pivot angle characteristic are fastened on the motor vehicle. This requires a proportionately high construction cost and a time consuming mounting or assembly.

These disadvantages are to be surmounted by the invention.

Therefore it is an object of the invention to create a position encoder that is coupleable with the gas pedal, and which encoder can be easily and quickly mounted in the motor vehicle, has a compact structure with few component parts and can be constructed in large quantities without technical production difficulties.

This object is aided in its solution according to the invention in the manner that the position encoder (9) has a housing (13) with a hollow cylindrical interior space (14), in which interior space (14) the rheostat (12) is located, the latter being fixed to the housing (13) prevented from turning with one of its two parts, which two parts are movable relative to one another, and with the other part (22) the rheostat is connected with a bell-shaped body (23), which body is rotatably mounted in the hollow cylindrical interior space (14) and is rotatable from a rest position against the force of a return (reset) spring (34; 35) via or by means of the gas pedal (10) as well as being provided with means (36, 37; 46, 48; 51) by means of which means, upon rotation of the body (23) by a certain pregiven amount, an electric switch (41, 49) is actuateable, the electric switch being secured on the housing (13).

By means of these measures a position encoder is obtained which has an extremely compact, assembly advantageous construction and a small structural volume and which can be quickly attached in the vehicle merely by means of two screws. A particular advantage of the position encoder according to the invention is that as a result of its encased or encapsulated type of construction an enhanced safety or security exists against damages of all kinds and also against soiling or fouling which negatively influence the functioning of the unit.

According to an advantageous embodiment of the invention, as means for the actuation of the electric switch (41) which switch is attached to the housing, a recess (46) can be present on the bell-shaped body (23), which recess extends over a portion of the outer periphery of the body, with the movable part (47, 40') of the electric switch projecting into the recess. The length and position of the recess on the outer periphery of the bell-shaped body is selected such that in the kick-down position of the gas pedal and thereby of the bell-shaped body, which body is coupled with the latter, the moveable part of the electric switch is moved in the sense of actuating the switch by means of the recess-free (the unrecessed) portion of the body.

Another advantageous possibility of realizing the means for actuating the electric switch is that the bell-shaped body (23) is provided with a collar or band (51), which collar or band extends over a portion of the outer periphery of the body (23), the collar cooperating with the moveable part (50) of the electric switch (49). In so doing, either the band or the bandless part of the bell-shaped body can be used for actuating the switch.

According to another embodiment of the invention a rolling element (37) is arranged between one face side (24) of the bell-shaped body (23) and the housing wall, which wall faces toward this front side (24), the rolling element (37) being mounted stationary in one of the two relatively moveable parts (13 or 23) in a recess (38) and engaging in a circular-annular sector shaped groove (36) in the other part, whereby the other face or front side (39) of the bell-shaped body (23) is in operative connection with the moveable part (40) of the electric switch (41). With this embodiment the rotary motion of the bell-shaped body in the kick-down case, is converted into a longitudinal-axial stroke movement, which movement brings about the actuation of the switch. This movement conversion is brought about in the manner that in the kick-down case the roller element runs out of the circular annular sector-shaped groove onto the face side of the bell-shaped body and thereby displaces the latter axially. The special advantage of this embodiment is that the switch can be housed or accommodated in the encoder or transmitter housing with particular economy of space. Beyond that the desired increase of the actuation force at the kick-down threshold or limit can be fixed or determined without difficulties, alone by the selection of the shape and diameter of the roller element and at least of the groove end and without influencing the construction of the switch. This is not possible with the other possible embodiments. As a roller element, a ball or sphere (37) is most suitably provided, although a cylindrical roller element can also be used. The latter, however, leads to a less favorable formation of the groove and of the recess mounting or supporting the roller element.

According to an advantageous embodiment of the invention the face side (24) of the bell-shaped body (23) is provided with a concentric longitudinally slotted shaft section (25), which shaft section projects from the housing (13), the shaft section having a conical surface (27) and an end (28) (which end has a threading (29)) for the reception and clamping fixing or attachment of a transmission element (32), the latter connecting the body (23) with the gas pedal (10), as well as having a concentric bore for the reception of the adjusting or setting shaft (22) of the adjustable rheostat (12). Such an embodiment has the advantage that the adjustable rheostat can be exchanged or replaced particularly easily. Thereby the position encoder not only can be adapted in a particularly quick and uncomplicated fashion to different motor vehicles, but also can be repaired much more easily than would be possible in a different construction. For the same reasons it has proved advantageous to arrange that part of the rheostat (12) which part carries the resistor or resistance track in a tubular holder or mounting (16), which holder is fastened to the housing (13), and to arrange that part of the rheostat which carries the resistance track with a radial lug or attachment (21) engaging in an axially parallel slot (20) of the holder (16).

For achieving a high reliability of operation of the position encoder it has proved advantageous to substitute for the reset or return spring, which engages in the bell-shaped body, two reset springs (34, 35) which are separated from each other. In this manner it is guaranteed that upon a breaking of one reset spring the position encoder remains operative in working order and the motor vehicle can still be driven to the repair service station under its own power. In order to give the driver the most distinct possible indication that a broken spring exists, it is recommended to select the spring characteristic of the two reset springs (34, 35) differently, so that a distinctly noticeable difference occurs between a position encoder with two intact reset springs and a position encoder with only one intact spring.

With the above and other objects and advantages in view, the present invention will be more clearly understood when considered with the accompanying drawings, of which:

FIG. 1 is a schematic block circuit diagram of a traveling speed control device for a motor vehicle;

FIG. 3 is a section through the position encoder according to FIG. 2 taken along the lines III—III;

FIG. 4 is a longitudinal cross-section through a position encoder of a different embodiment; and FIG. 5 is a longitudinal cross-section through a position encoder of still an additional embodiment.

Figure 2:
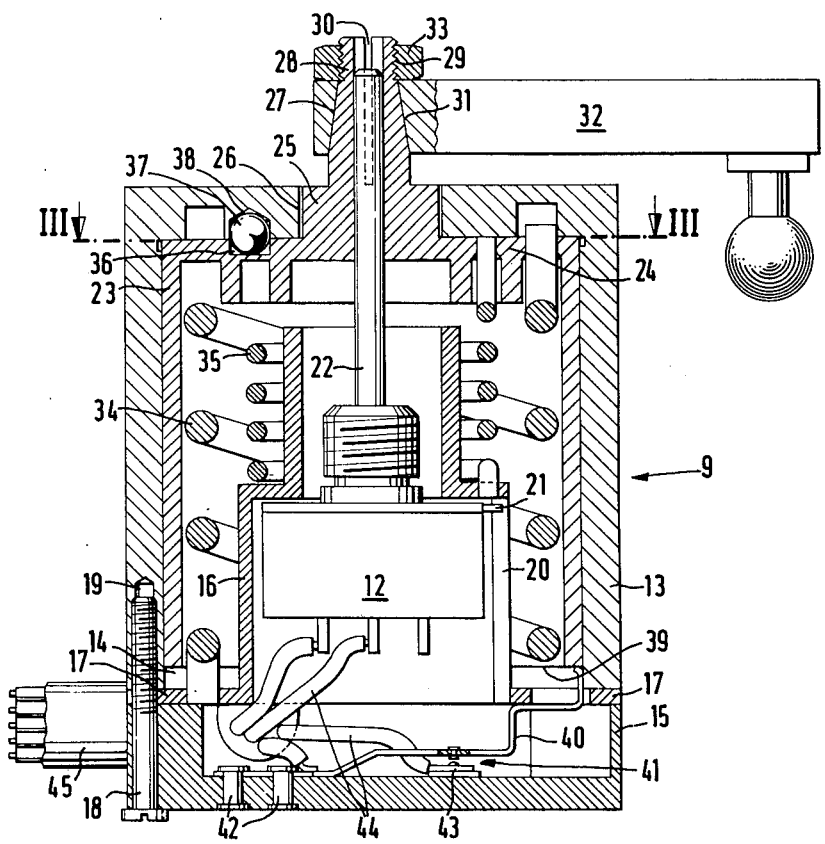
FIG. 2 is a longitudinal cross-section of the position encoder of the device according to FIG. 1.

The device for the control of the traveling speed of a motor vehicle contains an electric controller 1, which controller 1 essentially comprises a comparator 2, an amplifier 3, the amplifier being connected in series after the comparator 2, and a setting or adjusting device 4. The setting device 4 comprises an electric servomotor 5, a regulating unit or positioning actuator 6 and an electromagnetic coupling 7, which coupling is operatively inserted between the actuator 6 and the servomotor 5. The controller 1 contains in addition a position encoder 8, which encoder is connected with the actuator 6 and transmits a voltage to the input of the comparator 2, which voltage is proportional to the prevailing position of the position encoder 8.

A position encoder 9 which is coupled with the gas pedal 10 of the vehicle is connected to the other input of the comparator 2, which comparator, for example, is constructed of a series connection of two resistors, which resistors at their free ends receive and are acted upon by the signals to be compared and their ends that are connected with each other form the comparator output.

With this control device the prevailing position of the gas pedal 10 is transmitted via the position encoder 9 and the controller 1 to the throttle valve 11 of the driving motor of the motor vehicle.

The position encoder 9, which essentially comprises a variable resistor or rheostat 12 is accommodated in a cylindrical housing 13. The housing 13 is formed in the shape of a pot with a hollow cylindrical inner space 14, which space 14 is closed with a bottom part 15. Between the bottom part 15 and the front side of the housing 13, which front side is adjacent to the bottom part, a tubular holder or mounting 16 for the rheostat 12 is clamped or fixed with a band or collar 17.

The attachment of the parts 13, 15 and 17 with one another is achieved by means of several screws 18, which screws are distributed on the perimeter, and which are screwed into corresponding threaded bores 19 in the housing 13.

In the mounting 16 there is a longitudinal axial slot 20 into which a finger 21 engages, the finger being disposed on the rheostat 12. In this manner a fixing or securing in position of the rheostat 12 in the mounting 16 is achieved, which securing prevents twisting or turning, but permits an axial motion.

The setting or adjusting shaft 22 of the rheostat 12 is led out of the cylindrical holder 16 and is connected with a bell-shaped body 23, which body is mounted rotatably in the hollow cylindrical interior space 14 of the housing 13. The bell-shaped body 23 on its closed face side 24 changes over or transfers into a concentric shaft section 25, which section 25 projects out of the housing 13 through a corresponding opening 26 in the housing 13. The shaft section 25 has a conical surface 27, the latter running out into a shaft section 28 with an external thread 29. The part of the shaft section 25 that projects from the housing 13 is provided with at least one longitudinal axial slot 30. A coupling element 32 is mounted on the conical surface 27 of the shaft section 25 (the coupling element 32 being provided with a corresponding passage opening 31) and by means of the nut 33, which nut is screwed onto the external thread 29, the coupling element 32 is clamped securely in position, prevented from turning thereon. With the clamping in position of the coupling element 32, simultaneously the regulating shaft 22 is fixed or secured in position in the shaft section 25. The coupling element 32 is directly or indirectly coupled with the gas pedal 10.

In the space or gap between the bell-shaped body 23 and the tubular holder 16 two return springs 34 and 35 are arranged, of which the return spring 34 projects with one end into a hole in the collar 17 and with its other end projects into a hole in the face surface 24, and the reset spring 35 engages with one end in the hole in the tubular mounting 16 and with its other end engages in a hole in the face surface 24 of the bell-shaped body 23. The two reset springs 34 and 35 have different spring characteristic curves.

In the face side 24 of the bell-shaped body 23, there is further located a circular annular sector-shaped groove 36 for a ball 37, which ball 37 is mounted in a blind-end bore or blind hole 38 in that housing wall, which housing wall is opposite to the face side 24 of the bell-shaped body 23.

The front surface 39 which is remote or which faces away from the face surface 24, stands in operative connection with the moveable part 40 of a switch 41. The moveable part 40 of the switch 41 is attached to the bottom part 15 of the housing by means of two rivets 42.

The fixed contact 43 of the switch 41 is also seated on this housing portion 15. The electrical connection lines 44 for the switch 41 and the rheostat 12 are combined together in a cable 45 and led out of the housing 13 through an opening therein.

The rheostat 12 and its functioning per se are known and not necessary to be described further, suffice it to say that the two lines 44 connected to the projections of the rheostat 12 are connected to the resistance track (not shown) which is carried by the part 12 of the rheostat disposed in the holder 16, with one of the lines connected to the resistance track via the wiper or regulating shaft 22, the latter being a moveable part of the rheostat and operatively sliding in the resistance track.

The actuation of the switch 41 occurs when the bell-shaped body 23 is turned so strongly with respect to the housing 13 that the ball 37 arrives from out of the groove 36 onto the surface of the face side 24 and thereby the bell-shaped body 23 is pushed in the axial direction towards or against the bottom part 15. The end of the moveable contact element 40, which end lies or abuts on the front side 39 of the bell-shaped body, is then moved in the direction of the fixed contact 43 and the switch 41 is acutated in the sense of closing. Such a switch actuation occurs always in the case when the gas pedal is moved into its kick-down position.

The position encoder illustrated in FIG. 4 differs from the one previously described merely in the actuation of the kick-down switch 41. In place of the circular annular-sector shaped recess 36 and the ball 37 (the ball 37 running in the latter) according to FIGS. 2 and 3, which recess and ball in the case of kick-down cause an axial movement of the bell-shaped body 23, in the embodiment according to FIG. 4 a groove 46 is located in the lower part of the bell-shaped body 23, which groove extends over a portion of the outer perimeter of the body 23. The end 47 of the moveable part 40' of the switch 41 projects into the groove 46.

With an angle of rotation (specified or pregiven by the position of the groove 46) of the bell-shaped body 23, the end 47 of the switch part 40 is raised, via the slot end 48, from out of the slot 46, to the surface of the bell-shaped body 23, whereby the switch 41 is biased into closing.

With the embodiment according to FIG. 5, the switch 49 which is to be actuated in the case of kickdown, is attached on the peripheral area of the housing 13. The push rod 50 of the switch 49 projects toward or against the outside periphery of the bell-shaped body 23, which body 23 has on a portion of its periphery a collar or band-like attachment or projection 51. The positon of the collar 51 on the outer surface of the bell-shaped body 23 is chosen such that in the kick-down case, the collar or band 51 actuates the rod 50 in the sense of a closing of the switch. For example after turning of the bell-shaped body by a predetermined amount, the push rod 50, which may be spring biased toward the bell-shaped body 23, can leave the end of the projection 51 and extends and engages the non-elevated cylindrical surface of the bell-shaped body, whereby the switch 50 is designed so as to close when the follower rod 50 moves in this direction. The reverse may also be provided so that the switch closes (i.e. is actuated) when it arrives on the projection 51 and opens when it leaves the projection 51.

While there has been disclosed several embodiments of the invention, these are given by example only and not in a limiting sense.

I claim:

1. In a device for the control of the traveling speed of a motor vehicle with a vehicle driver actuatable gas pedal and with means for the transmission of the movement of the gas pedal to an element which influences the fuel-air mixture, particularly the throttle valve, which means contain a position encoder with an adjustable variable rheostat having two relatively moveable parts and a limit switch, the position encoder being coupled with the gas pedal, the improvement wherein the position encoder includes a housing forming a substantially hollow cylindrical interior space in which interior space the rheostat is disposed, the latter being operatively fixed to the housing prevented from twisting with one of its two relatively moveable parts, a bell-shaped body is connected to the other part of the rheostat, said bell-shaped body is rotatably mounted in the hollow cylindrical interior space, and at least one return spring means for biasing said bell-shaped body into a rest position, said bell-shaped body being operatively connected to the gas pedal such that by means of the latter the bell-shaped body is rotatable from said rest position against the force of said return spring means, an electric switch secured to said housing, means cooperating with said bell-shaped body for actuating said electric switch upon rotation of said bell-shaped body by a certain pregiven amount.

2. The device according to claim 1, wherein said bell-shaped body is formed with a recess extending over a part of the outer periphery of said bell-shaped body, said electric switch includes a movable part projecting into said recess constituting said cooperating means.

3. The device according to claim 1, wherein said cooperating means comprises, said bell-shaped body including a band which extends over a portion of the outer periphery of said bell-shaped body, said housing is formed with a recess, said band projects into said recess in the housing, said electric switch includes a moveable part, said band cooperates with said moveable part of said electric switch.

4. The device according to claim 3, wherein said moveable part of the switch constitutes a cam follower running on said band.

5. The device according to claim 1, wherein said cooperating means comprises, at least one rolling element disposed between one face side of said bell-shaped body and a wall of the housing, said wall of the housing faces said face side of said bell-shaped body, said wall of said housing and said face side of said housing constitute two relatively moveable members, one of said two relatively moveable members is formed with a bore and the other of said two relatively moveable members is formed with a circular annular sector-shaped groove, said at least one rolling element is mounted is mounted stationarily in said one of said two relatively moveable members in said bore and said rolling member engages in said circular annular sector-shaped groove in said other member, said electric switch includes a moveable part, said bell-shaped body has a portion in operative connection with the moveable part of said electrical switch.

6. The device according to claim 5, wherein said portion constitutes another face side of said bell-shaped body.

7. The device according to claim 5, wherein said rolling element is a ball.

8. The device according to claim 1, wherein said bell-shaped body is formed with a concentric, longitudinally-slotted shaft section, the latter projects from said housing, said shaft section is formed with a concentric bore and has a conical surface and an end, the latter is formed with a threading, said other part of the rheostat extends through said bore in said longitudinally-slotted shaft section, said other part of said rheostat constituting a regulating shaft, a transmission element constitutes means for operatively connecting said bell-shaped body with the gas pedal, means cooperating with said threading for clampedly fixing said transmission element on said conical surface of said shaft section.

9. The device according to claim 1, 5 or 8, further comprising a tube-shaped holder attached to said housing and formed with a groove parallel to its axis, said other part of said adjustable rheostat carries a resistance track and is disposed in said holder, said other part of said rheostat has a radial projection engaging in said groove of said holder.

10. The device according to claim 9, further comprising a collar secured to said housing and having an eccentric non-circular opening, said holder has a portion complementarily disposed in said opening of said collar, whereby said holder is non-rotatably attached to said housing.

11. The device according to claim 1, wherein said at least one return spring means constitutes two restoring springs which are separate from each other.

12. The device according to claim 11, wherein the spring characteristics of said two return spring means are different.

* * * * *